United States Patent [19]

Boese

[11] 4,391,793
[45] Jul. 5, 1983

[54] PLANT FOR THERMOCHEMICAL WATER DISSOCIATION BY SOLAR ENERGY

[75] Inventor: Friedrich-Karl Boese, Bergisch Gladbach, Fed. Rep. of Germany

[73] Assignee: Interatom, Internationale Atomreaktorbau GmbH, Bergisch-Gladbach, Fed. Rep. of Germany

[21] Appl. No.: 119,794

[22] Filed: Feb. 8, 1980

[30] Foreign Application Priority Data

Feb. 12, 1979 [DE] Fed. Rep. of Germany ....... 2905206

[51] Int. Cl.³ .............................................. C01B 1/02
[52] U.S. Cl. .................. 423/648 R; 252/373; 422/186; 423/459; 423/579; 423/650; 423/652
[58] Field of Search ................... 423/459, 579, 648 R, 423/650, 652, 415 A; 422/186; 250/528, 530; 252/373

[56] References Cited

U.S. PATENT DOCUMENTS 3,485,657 12/1969 Beaudry et al. ..................... 423/459
4,053,576 10/1977 Fletcher .............................. 423/579

OTHER PUBLICATIONS

Duffie et al., "Solar Heat Exchangers," Chemical Engineering Progress (vol. 56, No. 7), Jul. 1960, pp. 63-67.
Jacobson, *Encyclopedia of Chemical Reactions,* vol. II, (1948), Reinhold Publishing Co., p. 341.
Curl, "Direct Thermomagnetic Splitting of Water," *Int. J. Hydrogen Energy,* vol. 4, pp. 13-20, (Jul. 1978).
Gregory, "A Hydrogen-Energy System," paper prepared for American Gas Association by Institute of Gas Technology, pp. III-12 to III-68, (Aug. 1972).

*Primary Examiner*—O. R. Vertiz
*Assistant Examiner*—Wayne A. Langel
*Attorney, Agent, or Firm*—Herbert L. Lerner; Laurence A. Greenberg

[57] ABSTRACT

Plant for thermochemically dissociating water by solar energy, the improvement therein including at least one substance enclosed in electromagnetic fields and heatable by solar energy absorption to a temperature above 1.100° C., and method of operation of the plant.

8 Claims, 3 Drawing Figures

PLANT FOR THERMOCHEMICAL WATER DISSOCIATION BY SOLAR ENERGY

The invention relates to a plant and method for thermochemically dissociating water by solar energy.

Hydrogen is necessary for preparing many products such as ammonia, for example, and offers advantages for use as fuel, especially with respect to minimizing pollution of the environment. The processes for producing hydrogen by electrolysis have a disadvantage in that they require high-grade secondary energy in the form of electric power which itself must be generated by using considerable quantities of primary energy (it would hardly seem possible to increase the efficiency of the conversion much above 40%). This situation remains unchanged even if sunlight is employed as primary energy as long as the conventional path via steam generator-turbine-electric power generator is adhered to. If sunlight is converted directly into electricity, the efficiency is lower again by about one-half. The costs of plants converting solar energy into high-grade secondary energy can be lowered only by a dramatic improvement in efficiency to the point at which they are competitive in accordance with criteria which are valid today and for the immediately foreseeable future.

Besides electrolysis, a number of processes for thermochemically dissociating water are known, such as steam gasification according to the reaction $$C + H_2O \rightarrow CO + H_2. \tag{1}$$

The heat supply required to maintain the reaction must be made available here, however, by complete combustion of part of the applied carbon $$C + O_2 \rightarrow CO_2 \tag{2}$$

or, as has likewise been proposed heretofore, by a high-temperature nuclear reactor. However, the temperatures attainable therewith do not exceed 1,000° C. in view of the strength of the structural materials used. The conversion following the reaction (1) which is possible in accordance with the reaction.

$$CO + H_2O \rightarrow CO_2 + H_2 \tag{3}$$

also yields carbon dioxide and is additionally exothermic so that heat must be removed, which has an adverse effect upon the course of the process. In view of the limited availability of coal and hydrocarbons, recycling processes would be desirable which make the carbon available again, for example, according to the reaction.

$$2CO_2 \rightarrow 2CO + O_2 \tag{4}$$

which occurs, however, only at temperatures above 3,000° C., or $$2CO \rightarrow 2C + O_2 \tag{5}$$

at temperatures above 3,500° C., since only then is carbon present in the gaseous state of aggregation and are the entropy values high enough.

J. E. Funk and R. M. Reinstrom have shown in their paper "Energy Requirements in the Production of Hydrogen from Water," I&EC Process Design and Development 5 (1966), pages 336 to 342, that simple two-stage thermochemical water dissociation processes can be realized practically only at temperatures above 1,100° C. Three-and morestage processes, the maximal temperature of which is below this threshold, have the disadvantage that the equipment and control expenses are higher, that individual steps must be carried out with large excess quantities and that forcibly required steps are carried out at low temperature and only very slowly.

Basically, the attainment of high temperatures by means of solar energy presents no particular difficulties. In plants of heretofore known construction, wherein sunlight incident upon a large surface is reflected by a plurality of mirrors onto a common focal point, temperatures of more than 4,500° C. have already been achieved.

It is an object of the invention to provide a plant for thermochemical dissociation of water which operates with a cyclic two-stage process and utilizes the available solar energy as completely as possible, yet also allows a coupling-in of low-grade heat.

With the foregoing and other objects in view, there is provided in accordance with the invention a plant for thermochemically dissociating water by solar energy, the improvement therein comprising at least one substance enclosed in electromagnetic fields and heatable by solar energy absorption to a temperature above 1,100° C.

Through the absorption of the solar energy, which is advantageously focused in the previously mentioned manner, the solar energy can be utilized almost completely. The high temperature permits the performance of a number of reactions, of which reaction (5) is mentioned as an example which, together with others, for example reaction (1), result in a cyclic process. The selected example is also especially advantageous in that reactions ((5) and (1)) are endothermic, i.e., no waste heat has to be removed. Furthermore, a possibility of containing substances at the required high temperatures is indicated. This type of containment has been used at temperatures higher by several orders of magnitude in experiments for performing controlled nuclear fusion. The non-material reaction vessel formed in this manner is pervious or translucent to sunlight.

It is advantageous to heat up the reactands of such reaction directly and, in accordance with another feature of the invention, the substance is hot and consists of reactands of an endothermic reaction. However, a situation may also arise wherein the absorption properties of reactands which are suitable as such are insufficient. Then, in accordance with a further feature of the invention, the hot substance is combinable with reactands of endothermic reaction by heat conduction and/or heat radiation.

In accordance with an added feature of the invention, the substance to be heated up is pervious to light waves in the visible range, i.e. sunlight, but impervious to waves in the infrared range, i.e. thermal rays. The so-called hothouse effect which then occurs effects an especially loss-free heating of the enclosed substance.

This requirement need not be met for all substances otherwise suitable for thermochemical dissociation of water. In that case, and in accordance with an alternative feature of the invention, indirect heating of the hot substance or the reactands is accomplished by enclosing them in an enclosure formed of a substance with good heat absorption properties, the latter substance being, in turn, held in position, like the hot substance or the reactands themselves, by electromagnetic fields.

In accordance with yet another feature of the invention, low-grade heat is coupled-in by mixing a fluid at low temperature with a fluid heated to a high temperature due to absorption of solar energy in such a manner that the resultant mixed fluid has a temperature precisely sufficient for a given process.

In the foregoing example of a cyclic process, the reaction (1) proceeds at relatively low temperatures. It can be carried out, in accordance with a concomitant feature of the invention, by coupling-in relatively low-grade heat, i.e., heat with a temperature below 1,000° C. such as accrues, for example, as waste heat in other processes. Thermodynamic calculations indicate, for example, that one-third of the heat utilized in the cyclic process can be fed-in at a temperature of 600° C. if the fluid heated by the solar energy reaches a temperature of about 3,730° C. and the pyrolysis temperature of utilized process is about 1,730° C.

Other features which are considered as characteristic for the invention are set forth in the appended claims.

Although the invention is illustrated and described herein as embodied in a plant for thermochemical water dissociation by solar energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
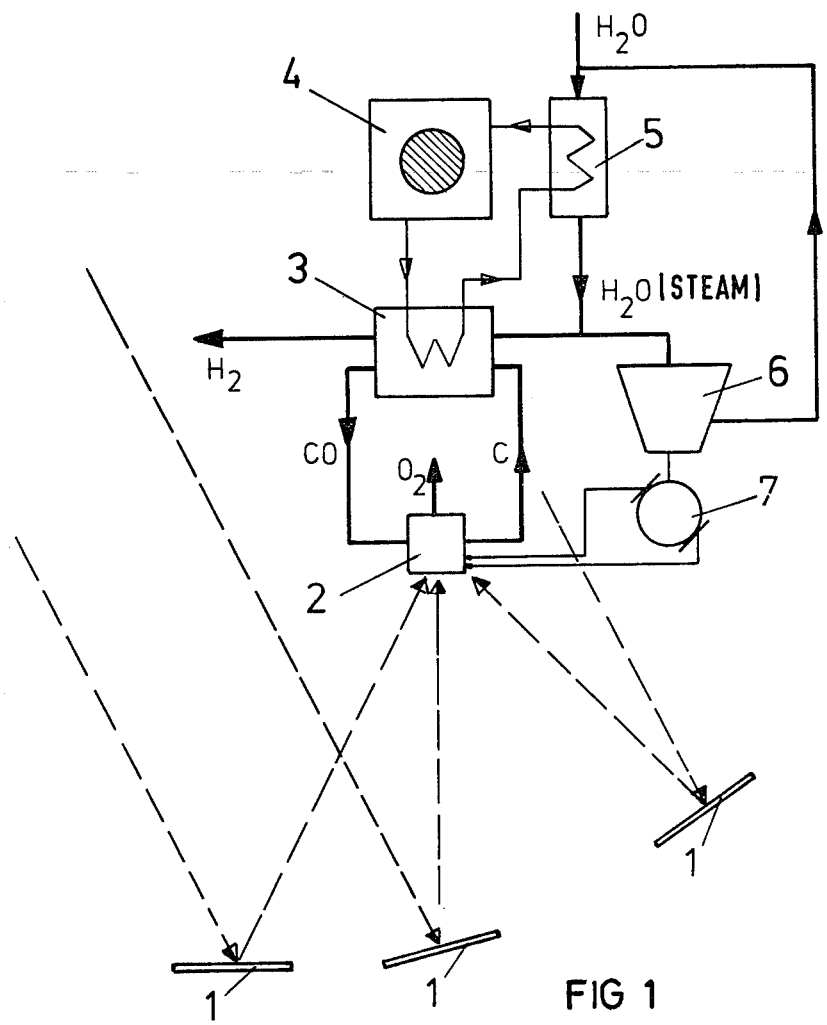
FIG. 1 is a circuit diagram of the overall plant, according to the invention.

Referring now to the drawing and first, particularly, to FIG. 1 thereof, there is shown the plant for thermochemically dissociating water which includes a plurality of mirrors 1 which, by means of non-illustrated devices, are tilted in accordance with the position of the sun in such a manner that the reflected sunlight (broken line) is concentrated in a focal point whereat a high-temperature reaction vessel 2 is disposed. In the latter, a temperature is attained at which carbon monoxide fed to the reaction vessel 2 is split into oxygen and gaseous carbon. The former is transported to another use outside the plant, while the carbon is fed to a steam gasifier 3, wherein it reacts, under a supply of heat, with likewise fed-in steam. Hydrogen is formed and is delivered as desired end product to a non-illustrated consumer; carbon monoxide is also formed and is returned to the reaction vessel 2 to be split again. The steam gasifier 3 can be heated in many conventional ways, known per se; In FIG. 1, the possibility is shown of heating the steam gasifier 3 with the coolant from a thermal power plant 4. The temperature range which is below that wherein steam gasification can be carried out, is applicable to the vaporization of the water fed to the plant as raw material in a steam generator 5. Part of the steam is expanded in a turbine 6 which drives a generator 7 furnishing the power required for maintaining the reaction vessel 2 as described immediately hereinafter.

Figure 2:
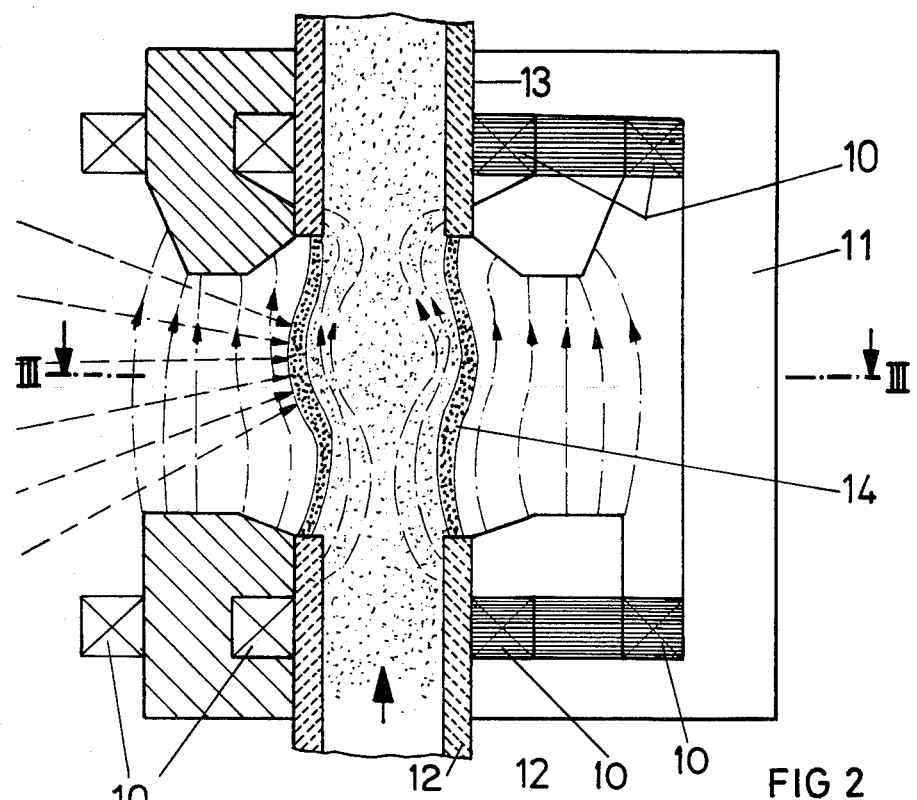
FIG. 2 is an enlarged, fragmentary longitudinal sectional view of FIG. 1 showing the high-temperature reaction vessel taken along the line II—II in FIG. 3.
Figure 3:
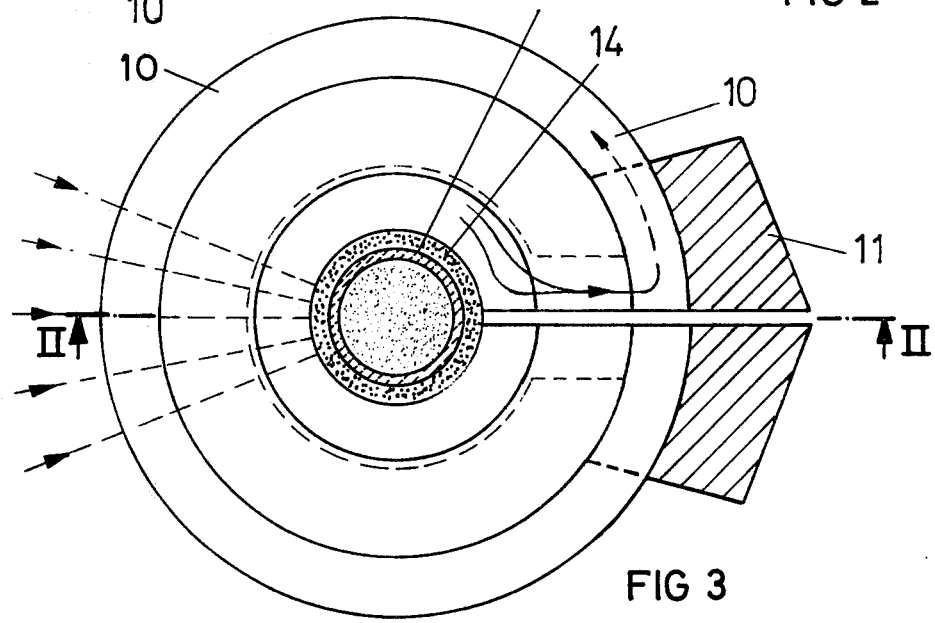
FIG. 3 is a cross sectional view of FIG. 2 taken along the line III—III.

The high-temperature reaction vessel 2 (note FIG. 2.) is formed by magnetic lines of force (dot-dash) which are produced by coils 10 which are wound on an iron core 11 and traversed by electric current; the electrical leads are not shown in the interest of preserving the clarity of the presentation. The coils 10 and the core 11 are advantageously mirror-coated to protect them against heat radiation. The reactand or reactands, for example CO, are fed-in through a first pipe 12 formed of ceramic, heat-resistant material. Since carbon monoxide has good absorptivity for thermal radiation and is ionizable, it can be heated directly by sunlight striking the reaction vessel 2 to a temperature which results in dissociation thereof into carbon and oxygen. These reaction products are discharged through a second pipe 13 which is likewise formed of ceramic material. Upon leaving the reaction vessel 2, the temperature of the reactands drops so quickly that recombination thereof is prevented, and the pipe 13 is protected against destruction, if necessary, by a non-illustrated cooling device.

If other reactands are used with less heat absorptivity, they can be enclosed in a material hull or shell 14 which is held together by an electromagnetic field; it may consist of a material with good heat absorption properties, such as of carbon dioxide, for example, which surrenders the absorbed heat to the reactands themselves.

I claim:

1. In a method of thermochemically producing hydrogen from water by solar energy, the improvement therein which comprises forming electromagnetic fields containing within an otherwise unenclosed space within a plant a substance thermochemically cleavable into two reaction products at a temperature above 1,100° C., one of said reaction products being reactable in gasifying apparatus with steam to produce hydrogen and the substance, concentrating the solar energy in the unenclosed space, formed by the electromagnetic fields circulating the reaction products from the space to the gasifying apparatus, and circulating the substance from the gasifying apparatus to the space.

2. Method according to claim 1 wherein the substance is carbon monoxide, the reaction products are carbon and oxygen, and the one reaction product is the carbon.

3. Method according to claim 1, wherein the substance is hotter than ambient and consists of reactands of an endothermic reaction.

4. Method of thermochemically producing hydrogen from water according to claim 1 which comprises performing multistage endothermic processes of which several stages are carried out at temperatures below 1,100° C. and others at temperatures above 1,100° C., and heating by the solar energy the reactands of the stages performed at the higher temperatures and, by another heating source, the reactands of the stages performed at the lower temperatures.

5. Method according to claim 1 wherein the substance enclosed in the electromagnetic fields is pervious to sunlight, yet impervious to thermal ways.

6. Method of thermochemically producing hydrogen from water according to claim 1 which comprises heating part of the reactands of an endothermic reaction by absorption of the solar energy to a higher temperature, and heating part of the reactands by another heating source to a temperature lower than the higher temperature and mixing both parts to obtain the substance having a temperature above 1,100° C.

7. In a plant for thermochemically producing hydrogen from water by solar energy, the improvement therein comprising means for forming electromagnetic fields within an otherwise unenclosed space within the plant, said space being capable of containing a substance thermochemically cleavable into two reaction products at a temperature above 1,100° C., one of said reaction products being reactable in gasifying apparatus with steam to produce hydrogen and said substance, means for concentrating the solar energy in said space, and means for circulating said reaction products from said space to said gasifying apparatus and for circulating said substance from said gasifying apparatus to said space.

8. Plant according to claim 1 wherein the enclosure is formed of another substance held together by the electromagnetic fields.

* * * * *